(12) United States Patent
Huber et al.

(10) Patent No.: US 7,527,341 B2
(45) Date of Patent: May 5, 2009

(54) BRAKE DEVICE WITH AN ACTUATOR OPERATED BY A PRESSURE MEDIUM

(75) Inventors: Jürgen Huber, München (DE); Thomas Rasel, München (DE); Rainer Knoss, München (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 247 days.

(21) Appl. No.: 10/533,390

(22) PCT Filed: Oct. 31, 2003

(86) PCT No.: PCT/EP03/12175

§ 371 (c)(1),
(2), (4) Date: Oct. 13, 2005

(87) PCT Pub. No.: WO2004/040160

PCT Pub. Date: May 13, 2004

(65) Prior Publication Data

US 2006/0108191 A1   May 25, 2006

(30) Foreign Application Priority Data

Oct. 31, 2002 (DE) ................................. 102 50 821

(51) Int. Cl.
*B60T 11/32* (2006.01)
(52) U.S. Cl. .................. 303/81; 303/71; 303/86
(58) Field of Classification Search ................. 188/170; 303/81, 71, 127
See application file for complete search history.

(56) References Cited

U.S. PATENT DOCUMENTS

| | | | | | |
|---|---|---|---|---|---|
| 3,724,609 | A | * | 4/1973 | Kobald | 188/170 |
| 3,980,348 | A | * | 9/1976 | Harrison | 303/115.3 |
| 4,057,297 | A | * | 11/1977 | Beck et al. | 303/71 |
| 4,326,754 | A | * | 4/1982 | Harding | 303/81 |
| 4,575,159 | A | * | 3/1986 | Emilsson | 303/71 |
| 5,190,359 | A | * | 3/1993 | Egerton | 303/86 |
| 5,568,844 | A | * | 10/1996 | Matsuki et al. | 188/68 |
| 6,594,993 | B1 | | 7/2003 | Friedrichsen et al. | |

FOREIGN PATENT DOCUMENTS

| | | |
|---|---|---|
| CA | 985349 | 3/1976 |
| DE | 297 08 124 U1 | 8/1997 |
| DE | 199 62 807 A1 | 7/2001 |
| EP | 1 086 867 A2 | 3/2001 |

* cited by examiner

*Primary Examiner*—Robert A Siconolfi
*Assistant Examiner*—James K Hsiao
(74) *Attorney, Agent, or Firm*—Barnes & Thornburg LLP

(57) ABSTRACT

A brake device is provided with an actuator which is operated by a pressure medium, used to apply and release a vehicle brake, especially a brake of a rail vehicle, includes an actuating piston which defines two pressure chambers. One pressure chamber impinges upon the vehicle brake in an applied position and the other pressure chamber impinges upon the vehicle brake in a release position. The two pressure chambers are connected to each other by a line with an overflow valve which opens at least during part of the transition phases—between the release position and open position—and which is otherwise closed.

6 Claims, 1 Drawing Sheet

BRAKE DEVICE WITH AN ACTUATOR OPERATED BY A PRESSURE MEDIUM

BACKGROUND AND SUMMARY OF INVENTION

The present disclosure relates to a brake device having an actuator, which is operated by a pressure medium, for the application and release of a vehicle brake, particularly of a rail vehicle brake.

From the state of the art, brake devices having pressure-medium-operated actuators are known where the brake is applied by the controlling of a pressure medium, such as compressed air, into the brake cylinder. This type of an active brake cylinder is used, for example, for the service brake of rail vehicles. Furthermore, pressure-medium-operated actuators with passive brake cylinders are known, where the application of the brake takes place by spring tension and the brake is released by the applying a pressure medium into the brake cylinder. Thus, despite a loss of pressure medium, such brakes are operable in the application direction and are used, for example, for parking or emergency brake devices of rail vehicles.

In the case of a brake device of this type according to European Patent Document EP-A-1 086 867, one of two pressure chambers separated by a piston is pressurized for the application of the brake. When the brake is released, the compressed air in the pressurized pressure chamber promotes the release operation in that it is guided by an actuator into the other chamber which is constantly connected with the atmosphere by a discharge which cannot be controlled. A pressure head therefore forms in the other pressure chamber which promotes a release of the brake. As a result of the overflowing of the compressed air, the latter is used several times and no longer has to be produced by the pressure medium source. In addition, the braking torque can rapidly be lowered in the event of a breakdown of the rotational wheel speed.

U.S. Pat. No. 4,575,159 describes a rail vehicle brake system having a cylinder piston drive in the case of which the piston is spring-loaded in the brake application position. Both sides of the piston can be acted upon by pressure medium by means of a control device which utilizes a pressure difference between the piston surfaces for the service brake.

In contrast, the present disclosure is based on the object of further developing a brake device of the initially mentioned type such that it has a still lower pressure medium consumption as well as a still faster reaction to braking and deceleration demands.

In the present disclosure, instead of releasing pressure medium into the environment for the reduction of pressure in the pressure chambers, a portion of the pressure medium present in the respective pressure chamber acted upon by pressure is guided into the other pressure chamber by opening an overflow valve and is utilized there for the pressure buildup. Pressure medium is therefore utilized several times and no longer has to be generated by the pressure medium source. This results in a lower pressure medium consumption of the pressure-medium-operated actuator and therefore in a pressure medium supply with smaller dimensions, particularly in smaller storage air tanks. As an alternative, while the dimensioning of the pressure medium supply is not changed, the size of the brake cylinder can be reduced in order to generate a defined braking or releasing force. This is because a portion of the braking or releasing force is generated already by the amount of pressure medium flowing over from one pressure chamber into the other pressure chamber. This is advantageous particularly when the actuator is used in low-floor short-distance vehicles, in the case of which a limited amount of space is available for the brake cylinders. Furthermore, the valve cross-sections of the ventilation valves and bleeder valves can be reduced because only a portion of the pressure medium required for the application and for the release of the brake respectively still flows through them.

Since the overflow valve now also acts during the transition phase between the release position and the application position, the overflowing pressure medium promotes the application operation, which results in a faster reaction to a braking demand. In comparison to European Patent Document EP-A-1 086 867, which utilizes overflowing medium only during the brake release phase, this pressure medium is not immediately discharged but remains in the pressure chamber until a pressure balance occurs, so that the pressure energy present in the pressure medium is optimally utilized. The ventilation and bleeder valves provide a further increase or decrease of the pressure level adjusted by the overflowing.

According to a particularly preferred embodiment of the invention, the adjusting piston is spring-loaded in the direction of the application position. This will result in an initially described passive brake cylinder. The pressure balancing valve is preferably opened until a fraction of a maximally reachable braking force or releasing force has been generated. The maximal force is then achieved by an additional ventilating and bleeding of the respective pressure chambers.

Preferably, ventilation and bleeder valves are provided for the ventilating and bleeding of the two pressure chambers, which are closed during the opening time of the overflow valve, a pressure buildup or pressure reduction taking place by the opening or closing of the ventilation or bleeder valves which exceeds the pressure balance in the two pressure chambers.

BRIEF DESCRIPTION OF THE DRAWINGS

An embodiment of the present disclosure is illustrated in the drawings and will be explained in detail in the following description.

DETAILED DESCRIPTION OF THE EMBODIMENT

Figure 1:
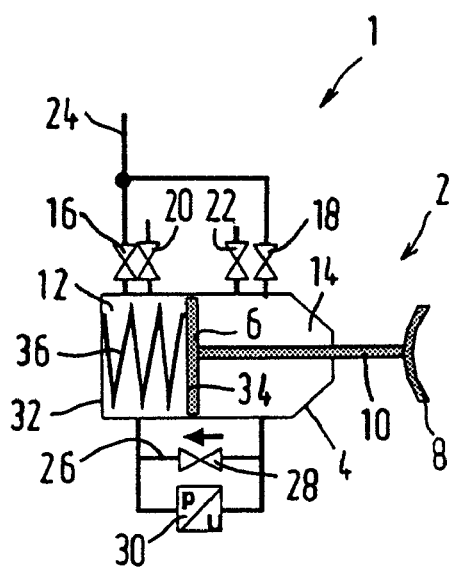
FIG. 1 is a schematic representation of an actuator of a rail vehicle brake according to a preferred embodiment of the disclosure at the start of the braking.

The actuator, which as a whole has the reference number 1 in FIG. 1, is part of a braking device of a rail vehicle and, according to a preferred embodiment, is used for operating a shoe brake 2, which contains a brake shoe 8 coupled with an adjusting piston 6 linearly movable within a brake cylinder 4. The brake shoe 8 interacts with a braking area of a wheel of the rail vehicle, which is not shown for reasons of scale. The brake shoe 8 is preferably fastened to a piston rod 10 of the adjusting piston 6, but a brake linkage may also be arranged in a known manner between the adjusting piston 6 and the brake shoe 8. Instead of a shoe brake 2, a disc brake may also be operated by the actuator 1.

By means of its two piston sides, which face away from one another, the adjusting piston 6 bounds pressure chambers of which one pressure chamber 12 acts upon the shoe brake 2 in the application position, and the other pressure chamber 14 acts upon it in the release position. The two pressure chambers 12, 14 are each pressurized or bled by one ventilation valve 16, 18 and one bleeder valve 20, 22 respectively. Compressed air of a compressed-air source may be used as the pressure medium. The two ventilation valves 16, 18 are connected on the input side with a pressure medium line 24; and on the output side, they lead into the respectively assigned pressure chamber 12, 14. The two ventilation valves 20, 22 are connected on the input side with the respective pressure chamber 14, 12 assigned to them and on the output side with the environment or atmosphere. Furthermore, the two pressure chambers 12, 14 can be connected with one another by way of a pressure medium line 26 having an overflow valve 28, which establishes or blocks the connection depending on the switching condition. The pressure difference between the two pressure chambers 12, 14 is measured by a relative pressure sensor 30 which is connected to the two inputs of the overflow valve 28.

By means of a spring element in the form of a coil spring 36, which is shown arranged inside the brake cylinder 4 and is supported on one side on the brake cylinder bottom 32 and on the other side on a piston surface 34 of the adjusting piston 4 pointing away from the brake shoe 8, the adjusting piston 6 is spring loaded in the direction of the application position. The coil spring 36 is therefore accommodated in the one pressure chamber 12 acting upon the adjusting piston 6 in the application position. The ventilation valves 16, 18, the bleeder valves 20, 22 and the overflow valve 28 are controlled by a control device, which is not shown for reasons of scale, which control device switches them as follows:

Starting from a release position of the shoe brake 2, in which the other pressure chamber 14 acting upon the adjusting piston 6 against the spring force of the coil spring 36 in the release position is maximally pressurized and the one pressure chamber 12 is maximally bled, upon a brake demand signal. At the start of a transition phase between the release position and the application position, the ventilation valves 16, 18 and the bleeder valves 20, 22 remain closed but the overflow valve 28 is opened. This situation is illustrated in FIG. 1, the arrow illustrating the flow direction of the compressed air. As a result, the compressed air, which is at a higher pressure, flows from the other pressure chamber 14 into the one pressure chamber 12. The overflow valve 28 will preferably remain open until essentially a pressure balance exists between the two pressure chambers 12, 14, which is detected by the relative pressure sensor 30. As an alternative, the overflow valve 28 can already be closed before the pressure balance has been reached. Under the effect of the coil spring 36 and of the pressure increased in the one pressure chamber 12, the adjusting piston 6 moves in the direction of the application position and builds up a braking force, which corresponds to a fraction of a maximally achievable braking force, preferably to approximately 50% of the maximally achievable braking force. The overflow valve 28 closes after the pressure balance has been achieved.

Figure 2:
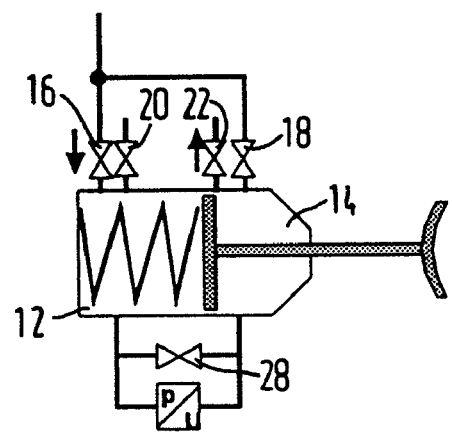
FIG. 2 is a view of the actuator of FIG. 1 in an advanced braking phase.

For building up a higher braking force, for example, the maximal braking force, the ventilation valve 16 of the one pressure chamber 12 is opened and external compressed air of the compressed-air source is fed. Simultaneously, the bleeder valve 22 of the other pressure chamber 14 is opened, as illustrated in FIG. 2. The pressure in the one pressure chamber 12 therefore continues to rise, while the pressure in the other pressure chamber 14 continues to fall.

Figure 3:
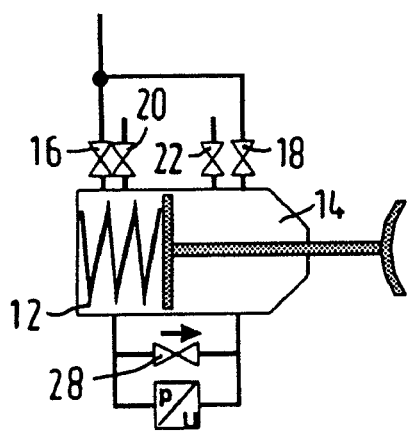
FIG. 3 is a view of the actuator of FIG. 1 at the start of a release phase.

Starting from the application position with the maximal braking force, at the start of a transition phase between the application position and the release position, ventilation and bleeder valves 16, 18, 20, 22 are closed, but the overflow valve 28 is opened. Again, this causes a pressure balance by the flowing-over of compressed air from the one pressure chamber 12 into the other pressure chamber 14, as indicated by the arrow in FIG. 3. In this case, the braking force affecting the brake shoe 8 decreases to, for example, 50% of the maximally reachable braking force.

Figure 4:
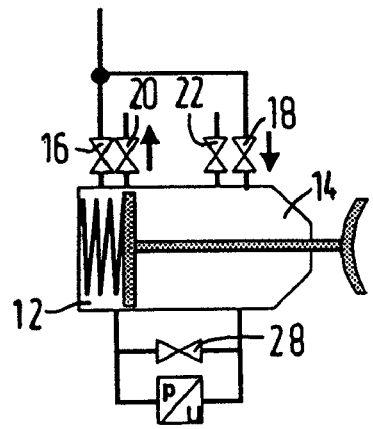
FIG. 4 is a view of the actuator of FIG. 1 in an advanced release phase.

For the further reduction of the braking force and for the complete release of the shoe brake 2, air flow valve is closed, the bleeder valve 20 assigned to the one pressure chamber 12 is opened, and by way of the also opened ventilation valve 18 of the other pressure chamber 14, external compressed air is fed into the other pressure chamber 14. This situation is illustrated in FIG. 4.

Summarizing, the overflow valve 28 is therefore opened at least during a portion of the transition phase between the release position and the application position and/or between the application position and the release position, and is otherwise closed.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A brake device having an actuator comprising:
   a brake cylinder and a piston in and dividing the brake cylinder into an application pressure chamber and a release pressure chamber;
   an overflow valve connecting the two pressure chambers, the overflow valve being opened at least during a portion of both transition phases between the application position and the release position until essentially a pressure balance exists between the two pressure chambers and is otherwise closed; and
   ventilation and bleeder valves connected to the two chambers for pressurizing and bleeding the two pressure chambers, the ventilation and bleeder valves are closed and the overflow valve is open during the pressure balance, and a pressure buildup or a pressure reduction exceeding the pressure balance in the two pressure chambers takes place by opening or closing the ventilation and bleeder valves.

2. The brake device according to claim 1, wherein the piston is spring-loaded in the direction of the application position.

3. The brake device according to claim 2, wherein the overflow valve is opened until a fraction of a maximally achievable braking force or releasing force has been generated.

4. The brake device according to claim 1, wherein the overflow valve is opened until a fraction of a maximally achievable braking force or releasing force has been generated.

5. The brake device according to claim 1, wherein the ventilation and bleeder valves are controlled by a control device for switching the valves.

6. The brake device according to claim 2, wherein the ventilation and bleeder valves are controlled by a control device for switching the valves.

* * * * *